(No Model.) 3 Sheets—Sheet 1.

T. F. ROWLAND, W. E. HILL & A. McLACHLAN.
CYLINDER WELDING APPARATUS.

No. 384,081. Patented June 5, 1888.

(No Model.) 3 Sheets—Sheet 2.
T. F. ROWLAND, W. E. HILL & A. McLACHLAN.
CYLINDER WELDING APPARATUS.
No. 384,081. Patented June 5, 1888.
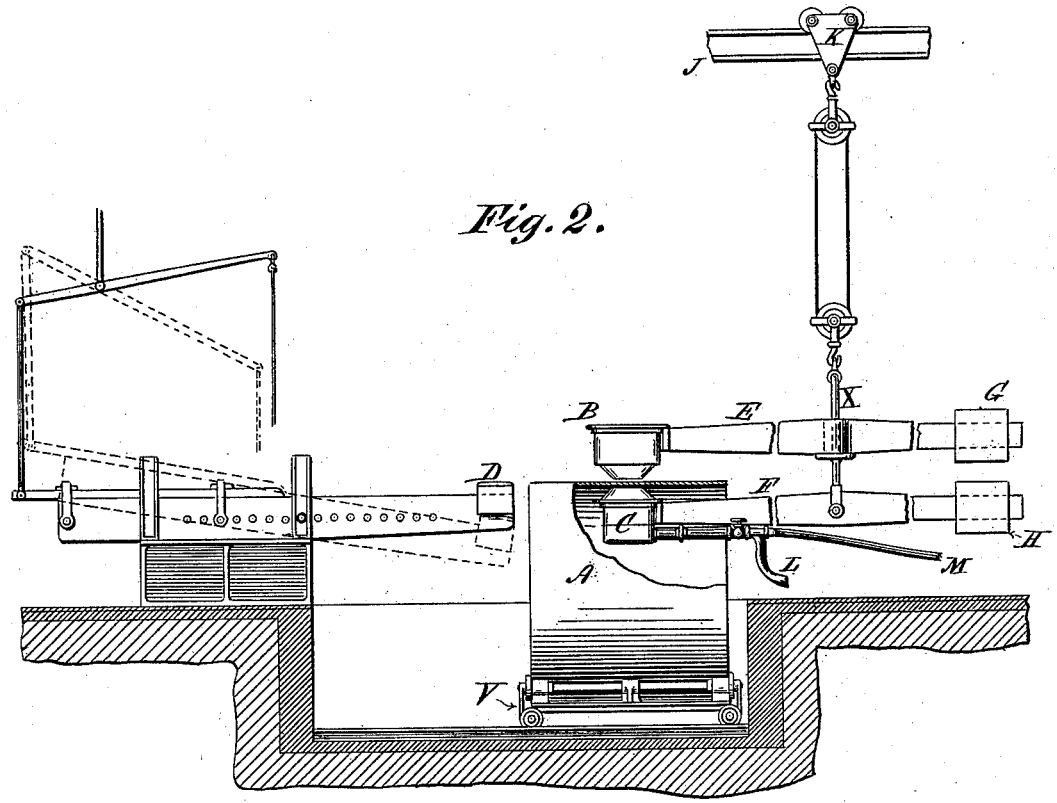
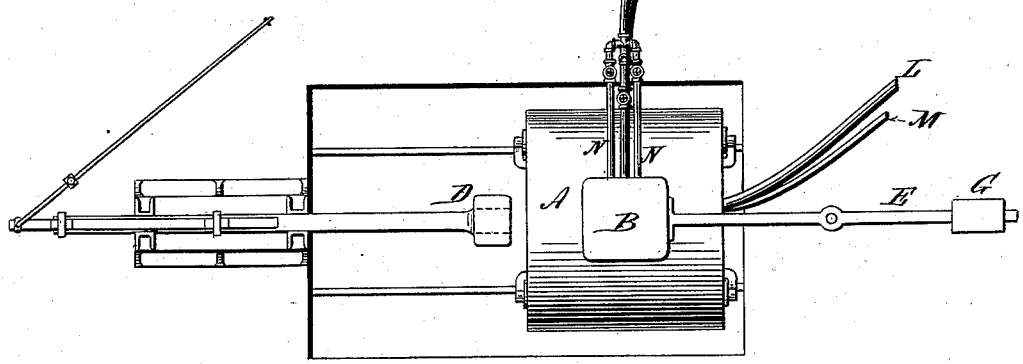

(No Model.) 3 Sheets—Sheet 3.

T. F. ROWLAND, W. E. HILL & A. McLACHLAN.
CYLINDER-WELDING APPARATUS.

No. 384,081. Patented June 5, 1888.

Witnesses:
Geo. H. Miatt
A. E. Hansmann

Inventors:
Thomas F. Rowland,
Warren E. Hill,
Angus McLachlan,
By their Attorneys
Dickerson, Foster & Freeman

UNITED STATES PATENT OFFICE.

THOMAS F. ROWLAND, OF NEW YORK, AND WARREN E. HILL AND ANGUS McLACHLAN, OF BROOKLYN, NEW YORK; SAID HILL AND McLACHLAN ASSIGNORS TO SAID ROWLAND.

CYLINDER-WELDING APPARATUS.

SPECIFICATION forming part of Letters Patent No. 384,081, dated June 5, 1888.

Application filed April 21, 1887. Serial No. 235,677. (No model.)

*To all whom it may concern:*

Be it known that we, THOMAS F. ROWLAND, of the city, county, and State of New York, and WARREN E. HILL and ANGUS McLACH-LAN, both of Brooklyn, Kings county, New York, have invented a new and useful Improvement in Welding-Furnaces, of which the following is a full, true, and complete description, reference being had to the accompanying drawings.

Our improvement relates to machines for welding seams, and especially for welding together the edges of metallic tubes. By means of it the edges of tubes of large diameter can be successfully welded.

Our improvement consists in a process of welding and mechanism for carrying the same into effect.

The essential part of our invention consists in two welding-furnaces—by preference, gas-furnaces—adapted to be brought within and without the seam to be welded and in juxtaposition to each other, and likewise to be withdrawn and moved out of the way when requisite. We have discovered that it is essential to thoroughly mingle the gas and air before they come to the point where they are to do their effective heating.

What we desire to claim as new is specified in the claims following this specification.

Our invention will be readily understood from the accompanying drawings, in which—

Figure 1:
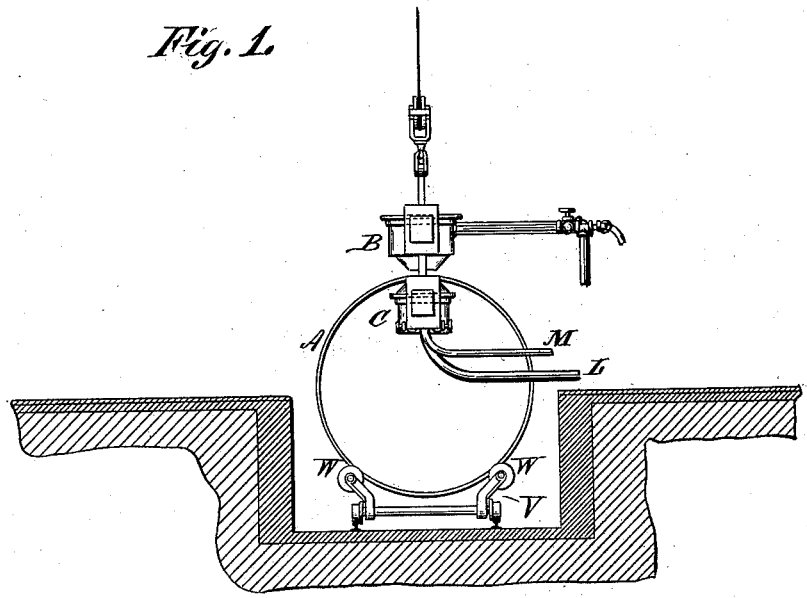
Figure 4:
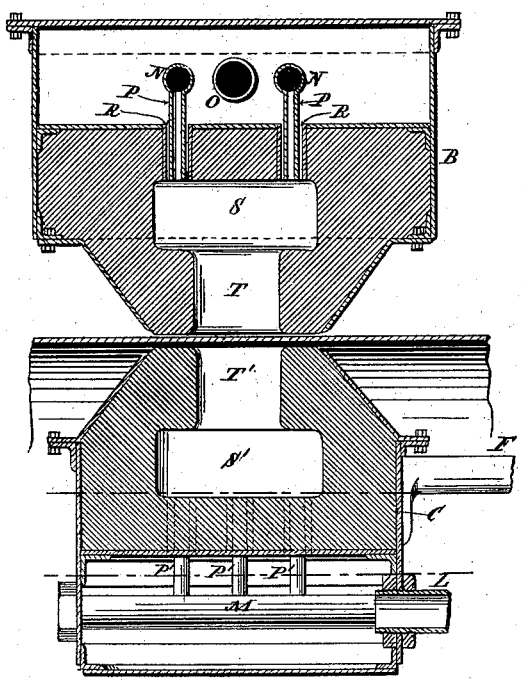
Figure 5:
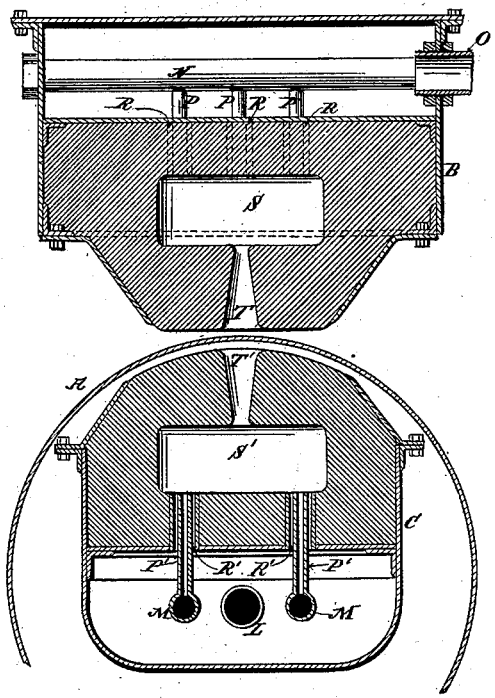

Figure 1 represents an end view of our apparatus in position to weld a boiler-furnace; Fig. 2, a side view of the same, showing the tube partly broken away; Fig. 3, a top view of the same; Figs. 4, 5, 6, and 7, details of the welding-furnace.

The body to be welded, which may be of any desired shape, (and we have shown a cylinder in process of welding,) is mounted, preferably in a pit or depression below the general level of the floor, upon a carriage.

A represents the cylinder to be welded, and V the carriage for supporting the same. This carriage can be moved longitudinally on rails, as shown, and the cylinder is supported upon rollers W, permitting of its rotation. The welding is done by the gas-furnaces B C, which heat the cylinder within and without, as shown. As soon as a portion of the cylinder has been heated to the welding heat, the carriage is run forward, so as to bring that part over the welding-anvil D, which can be depressed and raised, as shown, by the mechanism shown lowered in dotted lines. Any suitable anvil, of course, can be employed, or welding-rollers can be substituted. The anvil being raised beneath the heated portion, the weld is then made by hammers in the usual way, when the carriage can be run back and another portion heated.

The principal novelty of our invention consists in the peculiar construction and method of mounting of the welding-furnaces. The furnaces B C are mounted upon the swinging arms E F, counterbalanced by weights G H. These arms, of course, are made of suitable length. They are supported near their center of gravity upon vertical pivot X, around which they are free to turn horizontally. This pivot X is carried upon the overhead track by a carriage, as shown, and by the block and fall can be vertically adjusted. The furnace B is slightly underbalanced by the weight G, and the furnace C is slightly overbalanced by the weight H, so that these furnaces tend to come together when free so to do.

It will be observed that by the construction shown the furnaces B C, when the arms E F are parallel, are necessarily over each other, so that no longitudinal adjustment is necessary. The furnaces are fed with gas and air through separate pipes. The upper furnace, B, is fed by the air-pipe O and the gas-pipes N N. They are, of course, provided with flexible connections to allow of the swinging of the furnaces. The furnace itself consists of a casing of iron containing a mass of refractory material—for instance, fire-brick—within it. The pipe N branches, as shown, into two pipes, N N, each of which is provided with three vertical pipes, P, which in the furnace B are at right angles to the movement of the carriage. The pipe O enters the air-chamber formed above the fire-brick, as shown, and this chest is filled with the compressed air. Each of the pipes P is surrounded by a larger pipe, R, all of which pipes P P P P P P R R R R R R deliver into the mixing-chamber S, substantially square in section. The lower part of this chamber is provided with a burner, T, preferably made somewhat flaring. It is oblong in section, and its longer section is substantially parallel with the line of movement of the carriage. The construction of the lower furnace, C, is substantially the same, excepting that in this case the air and gas pipes L enter from the end of the cylinder. The air-pipe L delivers into the lower air-chamber, as before. The branch pipes M deliver through six pipes, P', into the mixing-chamber S', and these pipes P' are surrounded with the pipes R', as shown.

Figure 6:
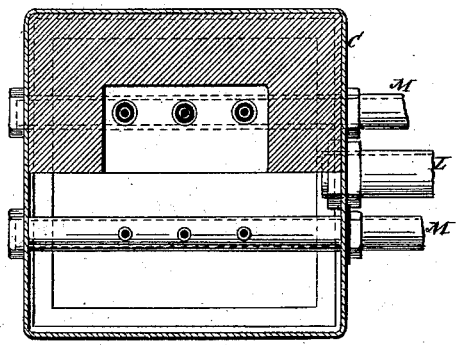

In Fig. 6 part of the furnace C is shown in section.

Figure 7:
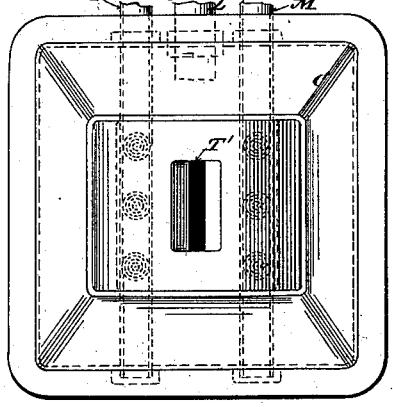

In Fig. 7 the burner T' is shown more in detail. This burner T' connects with the mixing-chamber S', as shown, the same way as the burner T connects with the mixing chamber S.

The operation of our apparatus will be readily understood. The cylinder A being placed on the carriage V, the furnaces B C, which at that time are run back on the track J, are run forward by means of the carriage K, after being properly lighted, and are separated by bringing the weights G H together, so that they will pass without and within the cylinder A. They are then allowed to come together, and the furnace is heated by means of the gas and air injected. The mixing-chamber S, with the entering tubes, is so constructed as to thoroughly mingle the air and gas there, while the effective heating does not take place until the mixture gets to the burner T. We have found this arrangement to be essential to make a proper weld. It will be observed that the air and gas pipes deliver in the chamber at one side of the burning-orifice, so as to insure a mingling in that chamber before the gas escapes through the burner.

We do not herein claim anything described and claimed in our application, Serial No. 235,678, filed herewith.

What we claim as our invention, and desire to secure by Letters Patent, is—

1. The combination, in a welding-furnace, of two gas-burners, B C, pivoted upon the same pivotal support, thereby enabling them to be brought one over the other, substantially as described.

2. The combination, in a welding-furnace, of the gas-burners B C, carried upon the same pivotal support, X, and mechanism for moving them longitudinally, substantially as described.

3. The combination of the pivoted gas-burners B C, the carriage V, and the welding mechanism D, substantially as described.

4. The combination of the gas-burners B C, carried by arms E F, supported by vertical pivot X, carried by carriage K on rail J, substantially as described.

5. The combination, with a welding-furnace, of air-pipe R, gas-pipe P, mingling-chamber S, and oblong burner T, substantially as described.

6. The combination, in a welding-furnace, of an air-chamber connecting with the pipe O and pipes P, the double pipes P and R, the mingling-chamber S, and burner T, substantially as described.

7. The combination, in a welding-furnace, of two gas-burners and mechanism for bringing them together within and without the tube or body to be welded and a carriage for supporting such tube and moving it longitudinally between the gas-burners, substantially as described.

8. The combination of two welding gas-burners and mechanism for moving them longitudinally and a carriage for supporting the tube or body to be welded and capable of longitudinal motion in the same direction as the motion of the gas-burners, substantially as described.

In testimony whereof we have signed our names to this specification in the presence of two subscribing witnesses.

THOMAS F. ROWLAND.
   WARREN E. HILL.
   ANGUS McLACHLAN.

Witnesses:
 CHAS. F. HATHAWAY,
 JAMES WILKINSON.